(12) United States Patent
Grant et al.

(10) Patent No.: US 9,664,539 B2
(45) Date of Patent: May 30, 2017

(54) TIME STAMPING A SENSOR SAMPLE

(71) Applicant: Research In Motion Limited, Waterloo (CA)

(72) Inventors: Christopher James Grant, Waterloo (CA); Robert George Oliver, Waterloo (CA); Nathan Daniel Pozniak Buchanan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 784 days.

(21) Appl. No.: 13/689,902

(22) Filed: Nov. 30, 2012

(65) Prior Publication Data
US 2014/0156227 A1  Jun. 5, 2014

(51) Int. Cl.
*G06F 17/40* (2006.01)
*G01D 9/00* (2006.01)
*G06F 17/00* (2006.01)
*G01D 21/00* (2006.01)

(52) U.S. Cl.
CPC ............. *G01D 9/005* (2013.01); *G01D 21/00* (2013.01); *G06F 17/00* (2013.01)

(58) Field of Classification Search
CPC ................................ G01D 9/005; G01D 21/00
USPC ........................................................ 702/187
See application file for complete search history.

(56) References Cited

U.S. PATENT DOCUMENTS

| 5,422,817 A | 6/1995 | Tazartes et al. | |
| 6,996,626 B1 | 2/2006 | Smith | |
| 7,937,232 B1 * | 5/2011 | Chow | G05B 21/02 702/125 |
| 8,006,556 B2 * | 8/2011 | Sheynblat | G01P 15/18 73/509 |
| 8,698,955 B2 * | 4/2014 | Sullivan | H04B 1/66 348/512 |
| 8,744,807 B2 * | 6/2014 | Dejori | G01D 9/005 702/187 |
| 2003/0171898 A1 | 9/2003 | Tarassenko et al. | |
| 2006/0250490 A1 | 11/2006 | Silverbrook et al. | |
| 2007/0260410 A1 * | 11/2007 | Raymond | G05B 21/02 702/81 |

(Continued)

FOREIGN PATENT DOCUMENTS

| CA | EP 2639551 A1 * | 9/2013 | ............. G01C 17/28 |
| CA | EP 2639554 A1 * | 9/2013 | ............. G01C 25/00 |

(Continued)

OTHER PUBLICATIONS

EPO, Extended European Search Report relating to application No. 12195049.7 dated May 6, 2013.

(Continued)

*Primary Examiner* — Paul D Lee
(74) *Attorney, Agent, or Firm* — Rowand LLP

(57) ABSTRACT

Methods and devices for determining a timestamp that represents a time a sensor sample was generated are described. In one aspect, a method includes: obtaining a sampling rate estimate for the sensor; determining an expected sample time based on the sampling rate estimate; detecting a sensor sample and assigning a reporting time to the detected sensor sample, the reporting time representing the time when the sensor sample was detected; and determining the timestamp for the sensor sample based on the expected sample time and the reporting time.

18 Claims, 5 Drawing Sheets

(56) References Cited

U.S. PATENT DOCUMENTS

| | | | |
|---|---|---|---|
| 2008/0080567 A1* | 4/2008 | Radulescu | H04J 3/0664 370/516 |
| 2011/0178708 A1 | 7/2011 | Zhang et al. | |
| 2012/0015730 A1 | 1/2012 | Watkins, Jr. et al. | |
| 2013/0245982 A1* | 9/2013 | Buchanan | G01C 19/00 7/93 |
| 2013/0245983 A1* | 9/2013 | Buchanan | G01C 25/005 702/94 |
| 2013/0301635 A1* | 11/2013 | Hollabaugh | H04W 56/0035 370/350 |
| 2014/0058685 A1* | 2/2014 | Buchanan | G01C 25/005 702/33 |
| 2014/0058704 A1* | 2/2014 | Buchanan | G06F 17/00 702/180 |
| 2014/0067305 A1* | 3/2014 | Oliver | G01B 21/16 702/92 |
| 2014/0067306 A1* | 3/2014 | Oliver | G01P 21/00 702/92 |
| 2014/0156227 A1* | 6/2014 | Grant | G01D 9/005 702/187 |
| 2015/0172317 A1* | 6/2015 | Osborne | H04L 9/3297 713/178 |
| 2015/0185054 A1* | 7/2015 | Hesch | G01P 15/02 702/187 |

FOREIGN PATENT DOCUMENTS

| | | | |
|---|---|---|---|
| CA | EP 2700904 A1 * | 2/2014 | G01C 19/5776 |
| CA | EP 2700908 A1 * | 2/2014 | G01C 19/00 |
| CA | EP 2738963 A1 * | 2/2014 | H04Q 9/00 |
| EP | 1 161 745 | 10/2002 | |
| EP | 1 563 255 | 3/2012 | |

OTHER PUBLICATIONS

Elmar Mair et al., "Spatio-temporal initialization for IMU to camera registration", Robotics and Biomimetics (ROBIO), Dec. 7, 2011, pp. 557-564, XP032165843.

John-Olof Nilsson et al., "Time synchronization and temporal ordering of asynchronous sensor measurements of a multi-sensor navigation system", Position Location and Navigation Symposium (PLANS), 2010 IEEE/ION, IEEE, Piscataway, NJ, USA, May 4, 2010, pp. 897-902, XP031706970.

Ayub, S., et al., "A Sensor Fusion Method for Smart Phone Orientation Estimation", dated 2012, retrieved Nov. 19, 2012.

Luttwak, A., "Human Motion Tracking and Orientation Estimation using inertial sensors and RSSI measurements", dated Dec. 28, 2011, retrieved Nov. 19, 2012.

Roetenberg, D., "Inertial and Magnetic Sensing of Human Motion", dated 2006, retrieved Nov. 19, 2012.

EP Office Action dated Jul. 22, 2016.

* cited by examiner

TIME STAMPING A SENSOR SAMPLE

The present disclosure relates generally to sensors, and more particularly, to a method of determining a timestamp associated with a sensor sample.

BACKGROUND

Timestamps are sometimes associated with sensor samples to represent the time at which a sensor sample was generated. Such time information may, for example, be useful to determine additional information from the sensor sample, such as an orientation of an electronic device.

For example, a gyroscope is a device for measuring a rate of rotation. Gyroscopes are sometimes included in electronic devices, such as handheld electronic devices, in order to provide information about the orientation of such electronic devices. Such orientation information allows the electronic device to know information about its own physical position. The gyroscope may allow for recognition of movement within a three dimensional space. The electronic device may use such orientation information as an input signal. That is, the electronic device may be operated in a mode in which gyroscope measurements affect the operation of the electronic device.

Gyroscope output is generally representative of the amount of rotation of the gyroscope per unit time (e.g. radians/second, degrees/second, etc.). A timestamp associated with a gyroscope sample may be used when determining the orientation device from this gyroscope output. That is, the timestamp may allow the gyroscope output to be translated from a value representing the rate of rotation to another value, representing the amount of rotation from a previous reference point, thereby allowing an orientation of the electronic device to be determined. Thus, the accuracy of the timestamp associated with a gyroscope reading may affect the accuracy of the orientation determination.

A timestamp may not be generated by the same system or component that generates sample data. For example, the sample data may be generated by a sensor and a timestamp may be applied by a processor. Since processors are often performing other functions, when the timestamp is applied by a processor, the timestamp may not be applied in a timely manner, resulting in a timestamp that is not accurate.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION OF EXAMPLE EMBODIMENTS

In one aspect, the present disclosure provides a processor implemented method of associating a sensor sample with a timestamp. The method includes: obtaining a sampling rate estimate for the sensor; determining an expected sample time based on the sampling rate estimate; detecting a sensor sample and assigning a reporting time to the detected sensor sample, the reporting time representing the time when the sensor sample was detected; and determining the timestamp for the sensor sample based on the expected sample time and the reporting time.

In another aspect, the present disclosure describes an electronic device. The electronic device includes a sensor and a processor coupled to the sensor. The processor is configured to: obtain a sampling rate estimate for the sensor; determine an expected sample time based on the sampling rate estimate; detect a sensor sample and assign a reporting time to the detected sensor sample, the reporting time representing the time when the sensor sample was detected; and determine a timestamp for the sensor sample based on the expected sample time and the reporting time.

In another aspect, the present disclosure computer readable storage medium comprising computer-executable instructions for associating a sensor sample with a timestamp. The computer-executable instructions includes instructions for obtaining a sampling rate estimate for the sensor, instructions for determining an expected sample time based on the sampling rate estimate, instructions for detecting a sensor sample and assigning a reporting time to the detected sensor sample, the reporting time representing the time when the sensor sample was detected, and instructions for determining a timestamp for the sensor sample based on the expected sample time and the reporting time.

Other aspects of the present disclosure will be described below.

Example Electronic Device

Electronic devices are sometimes equipped with one or more sensors which generate sensor samples. More particularly, such sensors measure a physical property, and the sensor samples that are produced identify that physical property.

For example, electronic devices may sometimes benefit from knowledge about their own orientation. Some such electronic devices are configured to operate based on the orientation of the electronic device. That is, the orientation of the electronic device may act as an input to an application, system or process whose actions depend on the orientation of the electronic device. For example, a display screen on a display of the electronic device may depend on the orientation of the electronic device. By way of example, the display screen may toggle between landscape and portrait orientations based on the orientation of the electronic device. In at least some such embodiments, a sensor may be used to determine the orientation of the electronic device. Such sensors may, for example, be referred to as orientation sensors.

Figure 1:
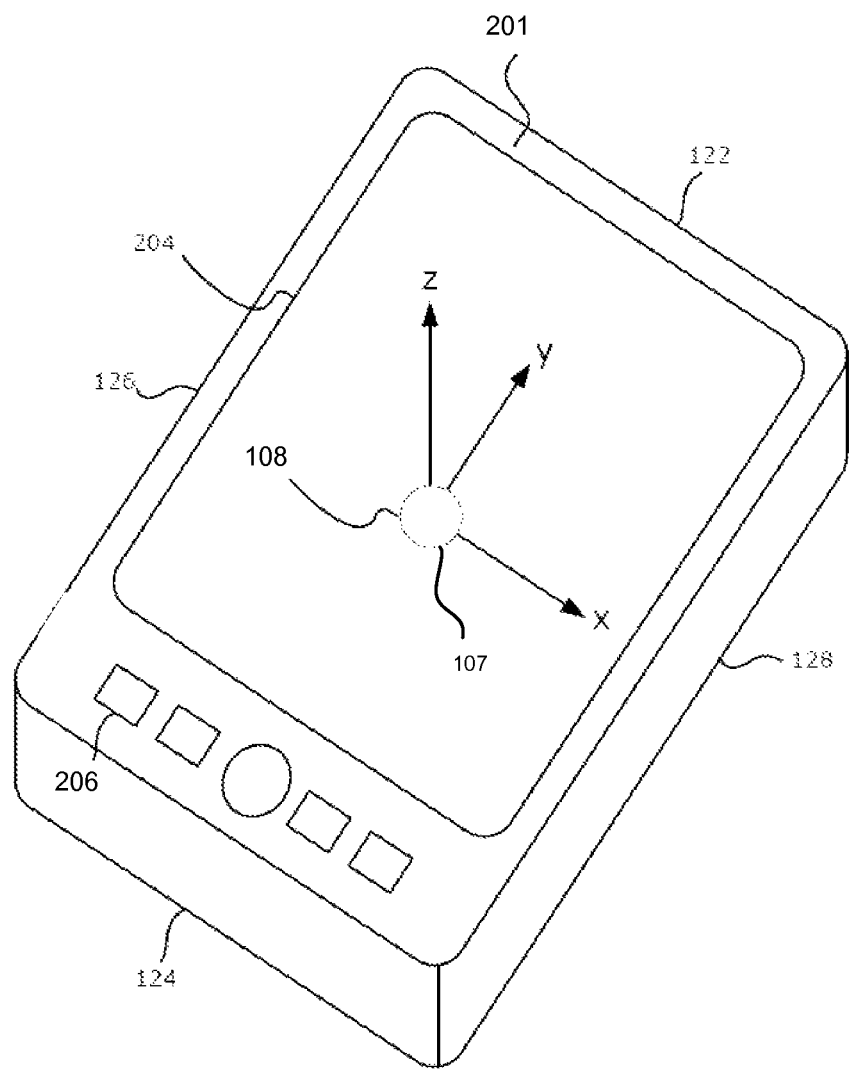
FIG. 1 is a perspective view of an electronic device having a sensor in accordance with example embodiments of the present disclosure.

An example of an electronic device 201 that includes a sensor 108 that is an orientation sensor is illustrated in FIG. 1. Referring first to FIG. 1, a sensor 108 is shown located within an electronic device 201. The electronic device 201 may take many forms. By way of example, the electronic device may be a global positioning system (GPS) unit, an inertial navigation system (INS), a mobile communication device such as a mobile phone or smartphone, a tablet computer, a laptop computer, a wearable computer such as a watch, a camera, or an electronic device of another type.

The electronic device 201 may be any electronic device which makes use of one or more sensors 108. In some embodiments, the electronic device 201 includes a display 204, such as a liquid crystal display (LCD), and an input interface 206, such as a keyboard or keypad or a navigation tool such as a clickable scroll wheel (also referred to as a track wheel or thumbwheel) or trackball. In some embodiments, the display 204 may be a touchscreen display which permits a user to provide input to the electronic device 201 by touching the display 204. That is, the display 204 may act as an input interface 206.

In some examples, the sensor 108 is a gyroscope 107. The gyroscope 107 measures rotational velocity of the gyroscope 107. In the embodiment illustrated, since the gyroscope 107 is integrated within the electronic device 201, the gyroscope 107 effectively measures rotational velocity of the electronic device 201.

The gyroscope 107 includes one or more sensing axis. In the embodiment illustrated, the gyroscope 107 includes three orthogonal primary sensing axes denoted x, y and z. Each sensing axis is orthogonal to the other sensing axes. For example, the x sensing axis is orthogonal to the y and z sensing axes, the y sensing axis is orthogonal to the x and z sensing axes and the z sensing axis is orthogonal to the x and y sensing axes.

The gyroscope 107 may produce a sensor sample that includes a gyroscope reading for each of the sensing axes. For example, a gyroscope reading $w_x$ may be produced by the gyroscope 107 based on gyroscope measurements associated with the x sensing axis (such as a rotation about the x sensing axis), a gyroscope reading $w_y$ may be produced by the gyroscope 107 based on gyroscope measurements associated with the y sensing axis (such as a rotation about the y sensing axis), and a gyroscope reading $w_z$ may be produced by the gyroscope 107 based on gyroscope measurements associated with the z sensing axis (such as a rotation about the z sensing axis). These gyroscope readings collectively form the gyroscope output. That is, the gyroscope output is an electronic signal which is representative of the gyroscope readings $w_x$, $w_y$, $w_z$ for the sensing axes x, y, z of the gyroscope 107. The electronic signal may, for example, provide the gyroscope readings $w_x$, $w_y$, $w_z$ for the sensing axes x, y, z of the gyroscope as measures of an amount of rotation per unit time about each sensing axis. For example, the gyroscope 107 may produce an output in terms of radians per second or degrees per second. The gyroscope output may, in some embodiments, be an analog output. In other embodiments, the gyroscope output may be digital. A gyroscope reading captured at a point in time may be referred to as a gyroscope sample or as a sensor sample.

In some embodiments, the gyroscope may be a digital gyroscope provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

As shown in FIG. 1, the sensing axes x, y, z may be aligned with the form factor of the electronic device 201. In some embodiments, the x sensing axis is aligned along an axis extending along the midpoint of the electronic device 201 between left and right sides 126, 128 of the electronic device 201, the y sensing axis is aligned along an axis extending along the midpoint of the electronic device 201 between top and bottom ends 122, 124, and the z sensing axis extends perpendicularly through the x-y plane defined by the x and y sensing axes at the intersection (origin) of these axes. In this way, when the electronic device 201 is oriented on a flat surface, such as a table, the x and y sensing axes are parallel to the table and the z sensing axis is perpendicular to the table. It is contemplated that the sensing axes x, y, z may be aligned with different features of the electronic device 201 in other embodiments.

It will be appreciated that other types of sensors 108 may be used in addition to or in place of a gyroscope 107. For example, in some examples a sensor that is a magnetometer may be included. A magnetometer (which may also be referred to as a digital compass) is a measuring instrument that is used to measure the strength and/or direction of magnetic fields. That is, the magnetometer generates an electronic signal which reflects the direction and/or strength of a magnetic field in the vicinity of the magnetometer. Since the magnetometer is mounted within the electronic device 201, the magnetometer effectively reflects the direction and/or strength of a magnetic field acting on the electronic device 201.

Similarly, in some embodiments, the sensor 108 may be an accelerometer. An accelerometer is a device that generates an output signal in dependence on the acceleration of the accelerometer. That is, the accelerometer produces an output which reflects the acceleration of the accelerometer. More particularly, the accelerometer may generate an output which specifies the magnitude and/or direction of acceleration. Since the accelerometer is integrated within the electronic device 201, the accelerometer effectively measures the acceleration of the electronic device 201.

In other embodiments, the sensor 108 may take other forms.

As will be described in greater detail below, the electronic device 201 may be configured to associate a sensor sample generated by the sensor 108 with a timestamp. In at least some example embodiments, the timestamp associated with the sensor sample may be used when determining the orientation of the device. For example, the timestamp may allow the gyroscope 107 output to be translated from a value representing the amount of rotation per unit time to another value, representing the amount of rotation from a previous reference point, thereby allowing an orientation of the electronic device 201 to be determined.

While FIG. 1 illustrates an electronic device 201 having a single sensor 108, the electronic device 201 may have a plurality of sensors. In at least some such electronic devices, the methods described herein may be used to apply timestamps to sensor samples for multiple sensors.

Figure 2:
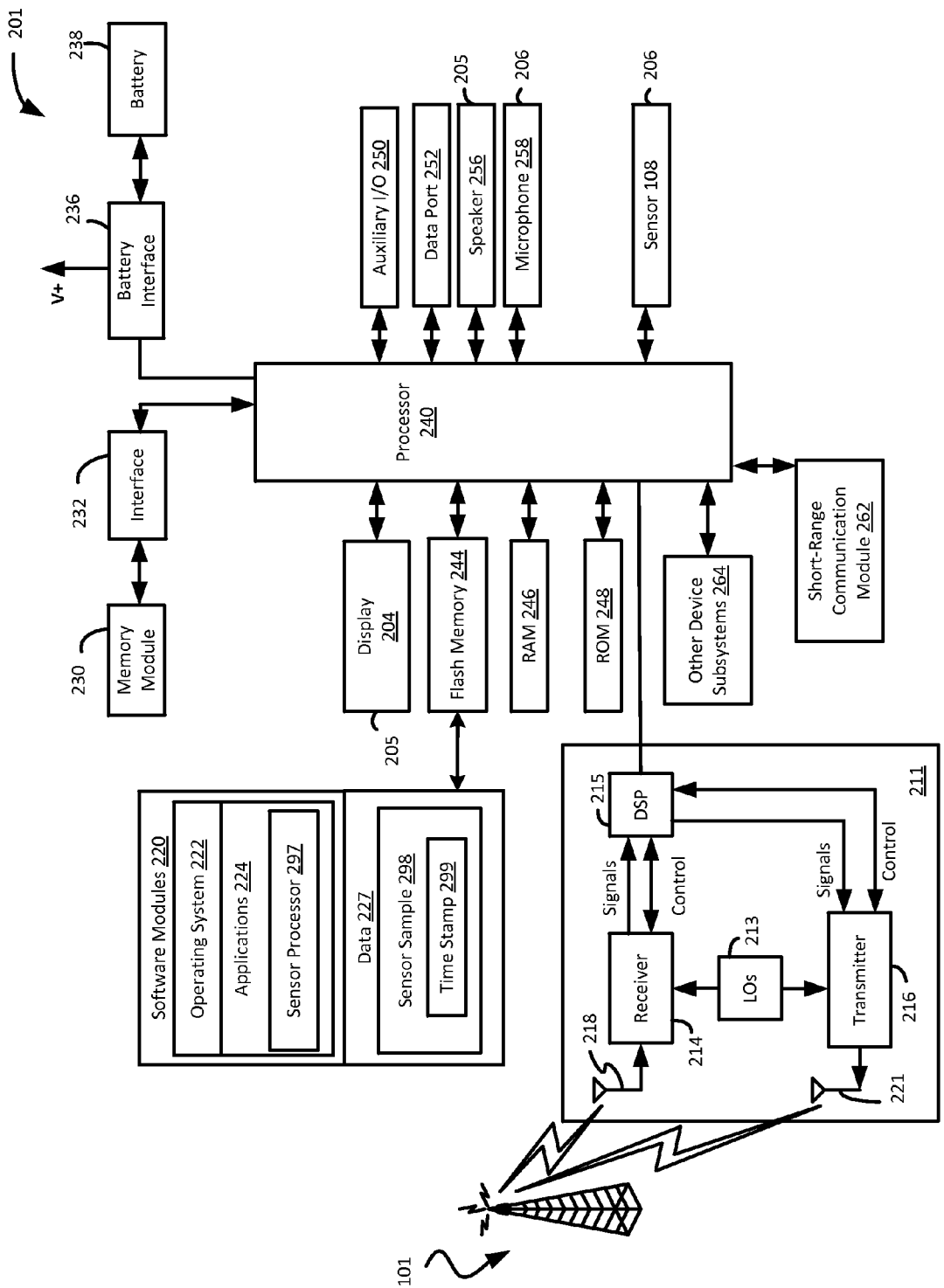
FIG. 2 is a block diagram of example components of an electronic device having a sensor in accordance with example embodiments of the present disclosure.

Referring now to FIG. 2, a block diagram of an example electronic device 201 is illustrated. The electronic device 201 of FIG. 2 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras, a sensor 108 (which may, for example, be a gyroscope 107, a magnetometer, an accelerometer, an image sensor, or a sensor of another type), and/or a touch-sensitive overlay associated with a touchscreen display), flash memory 244, random access memory (RAM) 246, read only memory (ROM) 248, auxiliary input/ output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces), a short range communication module 262, and other device subsystems generally designated as 264. Some of the subsystems shown in FIG. 2 perform communication-related functions, whereas other subsystems may provide "resident" or on-device functions.

The processor 240 includes or is connected to a clock or other timing components, which allows the processor 240 to determine a current time.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data.

The data 227 may, in at least some embodiments, include one or more sensor samples 298 generated by the sensor 108. Such sensor samples may be associated with a timestamp 299 which may be determined using the techniques described herein. More particularly, as will be described in greater detail below, the timestamp 299 for a sensor sample 298 may be created, maintained, and/or used by a software application or module, such as a sensor processor application 297.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes or is connectable to a power source, such as a battery 238. The battery 238 may be one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 includes a sensor 108, which detects or measures a physical property and which generates an electronic signal in dependence on the physical property. More particularly, the sensor 108 generates a sensor sample. The sensor 108 may, in at least some embodiments, be a three-axis gyroscope 107 of the type described above with reference to FIG. 1. A magnetometer, accelerometer, image sensor or another type of sensor may be included in the electronic device 201 instead of or in addition to the gyroscope 107.

The sensor 108 is configured to periodically generate a sensor sample and to provide the sensor sample to the processor 240. As will be discussed in greater detail below, the processor may assign a timestamp to the sensor sample.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, a sensor processor application 297.

In the example embodiment of FIG. 2, the sensor processor application 297 is illustrated as being implemented as a stand-alone application 224. However, in other example embodiments, the sensor processor application 297 could be provided by another application or module such as, for example, the operating system software 222. Furthermore, while the sensor processor application 297 is illustrated with a single block, the functions or features provided by the sensor processor application 297 could, in at least some embodiments, be divided up and implemented by a plurality of applications and/or modules.

Furthermore, while, in the example embodiment of FIG. 2, the sensor processor application 297 is illustrated as being associated with the main processor 240 of the electronic device 201, in other embodiments, the sensor processor application 297 could be associated with another processor, or group of processors. For example, in some embodiments, the sensor 108 may include or be connected to a secondary processor. The secondary processor may provide a narrow set of functions or features and may be used to offload some processing from the main processor 240. For example, in some embodiments, the secondary processor is a sensor-specific processor which is coupled to the sensor 108 and which is configured to provide sensor related functions such as those provided by the sensor processor application 297. For example, the secondary processor may be configured to determine a timestamp 299 for a sensor sample 298 in the manner described herein and may, in at least some embodiments, be configured determine further information (such as the orientation of the electronic device) based on the sensor sample 298 and the timestamp 299.

The sensor processor application 297 may be configured to determine the timestamp 299 for a sensor sample 298. The sensor processor application 297 may be configured to determine the timestamp based on a sampling rate estimate for the sensor 108. More specifically, the sensor processor application 297 may assign a timestamp based on typical sampling rates observed for the sensor 108. As will be described in greater detail below, the sensor processor application 297 may determine a theoretical time estimate for each sample. This theoretical time estimate, which may also be referred to as an expected sample time, represents the time that the electronic device 201 expects a sample to be obtained from the sensor 108. This expected sample time may be determined using a sampling rate estimate for the sensor 108. The sampling rate estimate may be obtained based on a historic sampling rate for the sensor 108 (e.g. based on the average time between sensor samples generated in the past for the sensor 108).

In order to assign a timestamp 299 to a sensor sample 298, the processor 240 may also be configured to monitor for and detect a sensor sample generated by the sensor 108. When a sensor sample is detected, a reporting time is assigned to the detected sensor sample. The reporting time represents the time when the sensor sample was detected.

Based on the expected sample time (which is the theoretical time when the electronic device 201 expects to detect a sensor sample) and the reporting time (which is the actual time when a sensor sample is detected), the sensor processor application 297 determines a timestamp 299 for the sensor sample 298. For example, the timestamp 299 for a sensor sample 298 may be determined as an average or as a weighted average of the expected sample time and the reporting time. Thus, the sensor processor application 297 provides a function which causes a reporting time to be adjusted to be closer to a theoretical time estimate when generating a timestamp.

Since the timestamp is determined, at least in part, based on this theoretical time estimate (i.e. since it is determined based on the expected sample time), the resulting timestamp may more accurately reflect the time that the sensor sample was generated by the sensor than if the reporting time was used exclusively to generate the timestamp. More particularly, the process of generating the reporting time may suffer from errors which cause the reporting time to differ from the time of generation of the sensor sample. For example, the sensor 108 may generate the sensor sample but a period of time may elapse before the sensor sample is detected by the processor 240. This delay may be due, for example, to the processor 240 performing other tasks and/or the processor being asleep when the sensor sample is generated and having to "wake up" before the sensor sample is detected. Where the processor is configured to generate a reporting time for the sensor sample when the sensor sample is detected, this delay may cause the reporting time to differ from the actual time when the sensor sample was generated. However, since the expected sample time (which is the theoretical time when the electronic device 201 expects to detect a sensor sample) is considered when generating the timestamp, the effect of such errors may be mitigated.

Further, by also utilizing the reporting time to generate a timestamp, the electronic device 201 may account for variations in the sampling rate of the sensor 108. Such variations may occur, for example, due to variations in operating and/or environmental conditions associated with the electronic device 201. For example, variations in the sampling rate might occur due to a variation in temperature in the vicinity of the electronic device 201. Since the determination of the timestamp considers the reporting time (e.g. the actual time when the sensor sample was detected), the resulting timestamp considers such variations in the sampling rate.

Accordingly, the sensor processor application 297 may be configured to assign a timestamp 299 to a sensor sample 298. Thus, the electronic device 201 includes a timestamp generating component. In at least some embodiments, the timestamp 299 may be associated, in memory, with the sensor sample 298. For example, the timestamp 299 and the sensor sample 298 may both be stored in memory and an association created.

In at least some embodiments, the electronic device 201 also includes a missed sample detector which is configured to detect missed samples. The missed sample detector may be a component of the sensor processor application 297 or another application 224. Sensor samples may sometimes be skipped by the processor 240. That is, the processor 240 may not detect one of the samples and may, instead, detect a subsequent sample. When a missed sample occurs, the expected sample time for a subsequent sample may be inaccurate.

As will be described in greater detail below with reference to FIGS. 4 and 5, the reporting time and the expected sample time may be compared to determine whether a sample has been skipped. Thus, in at least some embodiments, the electronic device 201 may be configured to provide for missed sample detection.

As noted previously, the timestamp 299 associated with a sensor sample 298 may be used to determine further information. For example, in at least some embodiments, the electronic device may use the timestamp 299 and the sensor sample 298 to determine an orientation of the electronic device 201. Accordingly, in at least some embodiments, the electronic device 201 also includes an orientation determination component which is configured to determine the orientation of the electronic device. The orientation determination component may be a component of the sensor processor application 297 or another application 224. As noted previously, in at least some example embodiments, the sensor 108 is a gyroscope 107. In at least some such embodiments, the orientation of the electronic device 201 may be determined using a reference orientation, which defines a prior orientation of the electronic device 201. The timestamp and the sensor sample (i.e. the gyroscope sample) may be used to quantify the rotation from the reference orientation.

Further functions and features of the sensor processor application 297 will be described in greater detail below with reference to FIGS. 3 to 5.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Assigning Timestamp to Sensor Sample

Figure 3:
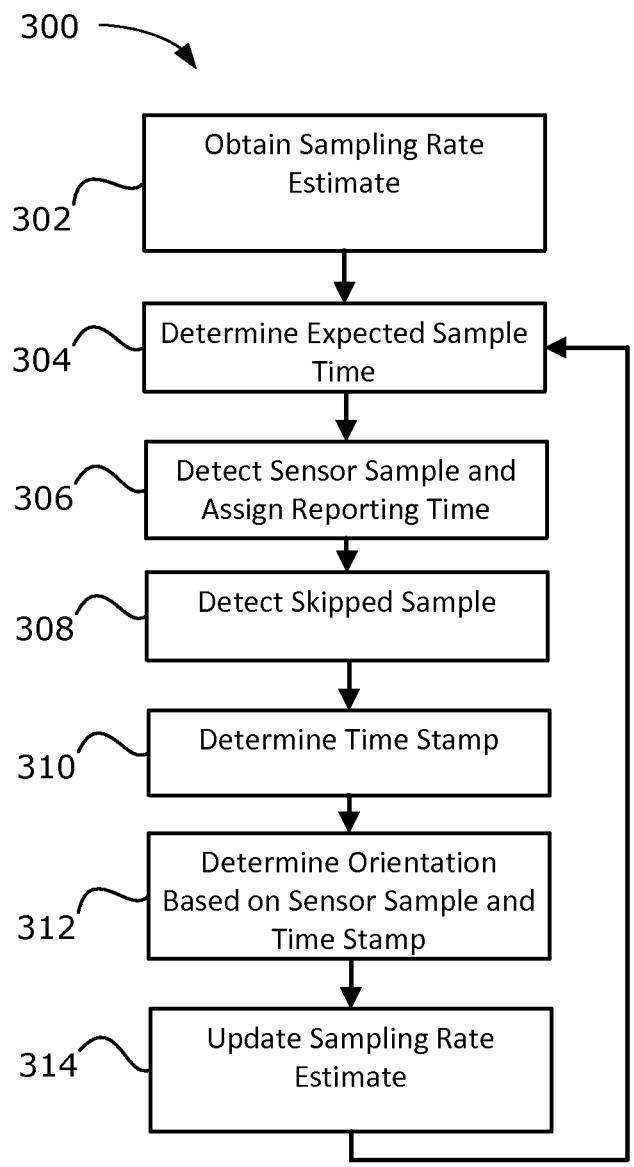
FIG. 3 is a flowchart of an example method for determining a timestamp for a sensor sample.
Figure 4:
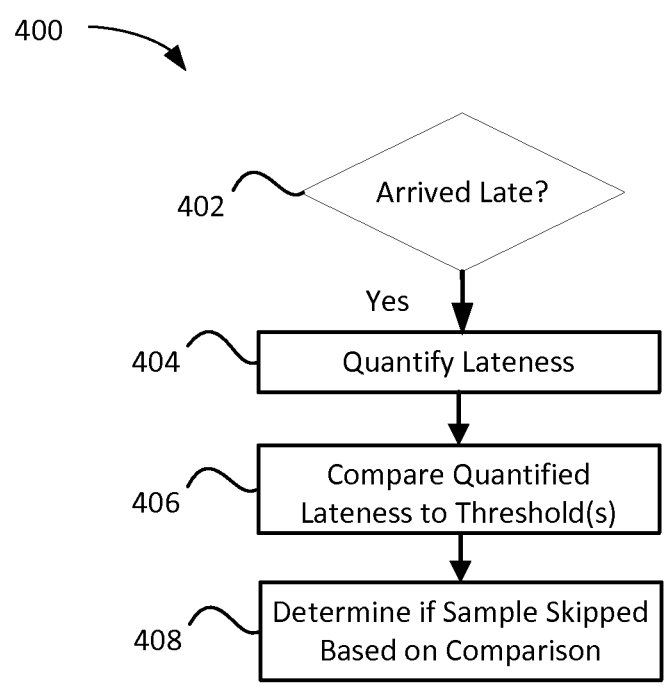
FIG. 4 is an flowchart of an example method for determining if a sensor sample was skipped.
Figure 5:
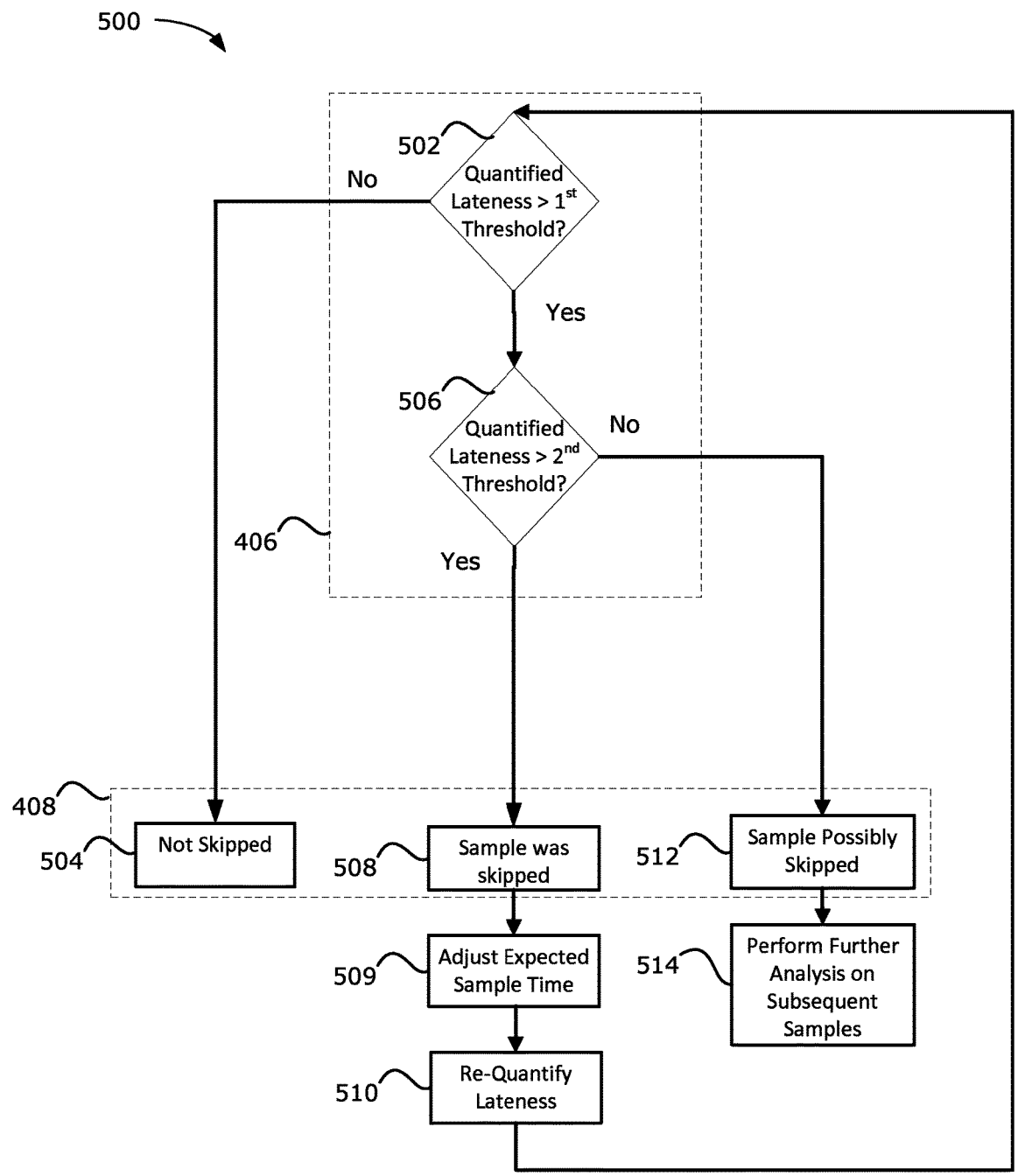
FIG. 5 is a flowchart of an example method for determining if a sensor sample was skipped.

In the description which follows, reference will be made to methods 300, 400, 500 which are illustrated in FIGS. 3 to 5. Any one or more of these methods 300, 400, 500 may include features which may be provided by an electronic device 201, such as the electronic device 201 of FIGS. 1 and 2. For example, one or more applications or modules associated with an electronic device 201, such as the sensor processor application 297 (FIG. 2), may contain processor readable instructions for causing a processor associated with the electronic device 201 to perform one or more operations of the methods 300, 400, 500 of FIGS. 3 to 5. That is, in at least some example embodiments, the electronic device 201 may be configured to perform one or more of the methods 300, 400, 500. For example, one or more of the methods 300, 400, 500 may be implemented by a processor 240 (FIG. 2)

of an electronic device 201 (FIG. 2). Thus, features that are described below as being provided by the electronic device 201 may be provided by the processor 240 which executes processor readable instructions.

In at least some embodiments, one or more of the functions or features of one or more of the methods 300, 400, 500 may be performed, in whole or in part, by another system, software application, module, component or device apart from those specifically listed above. For example, in some embodiments, one or more of the methods 300, 400, 500 may be performed by a processor associated with the sensor 108. That is, in at least some embodiments, one or more of the methods 300, 400, 500 or a portion thereof may be performed by a processor other than the main processor the electronic device 201. A processor which is associated with the sensor 108 and which may be used for the specific purpose of controlling the sensor 108 (i.e. a sensor-specific processor) may be configured to perform one or more of the methods 300, 400, 500 or a portion thereof.

Referring first to FIG. 3, a method 300 of associating a sensor sample with a timestamp is illustrated.

At 302, the electronic device 201 obtains a sampling rate estimate for the sensor 108. The sampling rate estimate is a measure of the frequency at which the electronic device 201 obtains a sensor sample.

To obtain a sampling rate estimate, the electronic device 201 may obtain a plurality of sensor samples from the sensor 108 and may note the time period over which the samples were obtained. For example, the electronic device 201 may obtain five consecutive samples and may note the time period over which the five samples were obtained and may then determine the sampling rate. For example, the sampling rate estimate may be determined as the quotient of the number of samples divided by the time period. Thus, in at least some examples, the sampling rate estimate may be a measure of the number of samples per unit time (e.g. # samples/second).

It will be appreciated that the sampling rate estimate may, be expressed in other ways in other examples. For example, in some embodiments, the sampling rate estimate may be expressed in terms of the average time between samples. For example, the sampling rate estimate may be expressed in seconds.

Furthermore, the sampling rate estimate may initially be obtained in other ways. For example, in some embodiments, the sampling rate estimate may initially be set to a default value, such as a specification value provided, for example, by a sensor manufacturer. In at least some such embodiments, the specification value may be stored in memory of the electronic device and may be retrieved at 302.

At 304, the electronic device 201 may determine an expected sample time based on the sampling rate estimate obtained at 302. More specifically, the electronic device 201 may determine a theoretical time estimate for the next sample. This time estimate represents the time when a next sample is expected to be obtained. The expected sample time may be determined based on the time associated with the last sensor sample (which may the time reflected by a timestamp associated with the last sensor sample) and also based on the sampling rate estimate. Since the sampling rate estimate may be determined based on the time period between sensor samples obtained in the past, the expected sample time is effectively determined based on historic sampling rate data. The expected sample time reflects the time when a next sample is expected.

At 306, the processor 240 detects a sensor sample and assigns a reporting time to the detected sensor sample. More particularly, the processor 240 may continually attempt to identify a sensor sample which is periodically generated by the sensor 108 and which may be obtained by the processor 240. Since the processor 240 may perform other functions, apart from sensor sample detection, there may be delay between the time when a sensor sample is generated by the sensor 108 and the time when it is detected by sensor processor application 297 running on the processor 240. When the processor 240 detects the sensor sample, the processor 240 may assign a reporting time to the detected sensor sample. The reporting time represents the time when the sensor sample was detected and may be determined by consulting a clock or other timing components associated with the processor 240. That is, when a sensor sample is detected, the clock or other timing components may be consulted to determine a measure of the current time, which may be assigned as a reporting time to the detected sensor sample.

In some embodiments, it may be possible for a sensor sample to be skipped and to go undetected. That is, a sensor sample may be generated between the sensor sample detected at 306 and a last detected sensor sample (which may have been detected during a previous iteration of 306), but may not be detected at the processor 240. This may occur, for example, when the processor 240 is engaged in processing activities which cause a relatively large delay for sensor monitoring activities and when the sensor 108 does not include a buffer for storing sensor samples, or when a buffer is provided but has insufficient capacity to accommodate the delay. In order to account for skipped samples, in at least some embodiments, at 308 the electronic device 201 may detect whether a sample has been skipped.

Methods of detecting skipped samples will be described in greater detail below with reference to the methods 400, 500 of FIGS. 4 and 5.

At 310, the processor 240 may determine a timestamp for the sensor sample based on the expected sample time and the reporting time. That is, both the expected sample time and the reporting time for a sensor sample may be used to determine the timestamp. In some examples, the timestamp may be determined as an average of the expected sample time and the reporting time. In some examples, the timestamp may be determined as a weighted average of the expected sample time and the reporting time. The weights that may be applied when determining the timestamp may be predetermined and may be stored in memory associated with the electronic device 201.

In some examples, the weights that are used may depend on whether the sensor sample arrived early or whether the sensor sample arrived late. A sensor sample may arrive later than expected due to any of a number of reasons. For example, as noted above, a sensor sample may be observed by the processor after the time when it is expected to be observed (i.e. the reporting time may be later than the expected sample time) if the processor is preoccupied with other processing activities. In such cases, the reporting time may be less accurate than the expected sample time (i.e. the expected sample time may be a more accurate reflection of the time that the sensor sample was generated). However, when a sensor sample arrives early, the cause of the early arrival is likely due to an inaccurate expected sample time. This may be caused, for example, when the sampling rate estimate does not accurately reflect the sampling rate of the sensor 108. Accordingly, the relative accuracy of the reporting time and the expected sample time as a measure of the time that a sensor sample was generated may vary depending on whether the sensor sample arrived late or early.

In at least some embodiments, at 310, the processor 240 may determine whether a sensor sample is early and/or whether a sensor sample is late. This determination may be made by comparing the reporting time assigned at 306 to the expected sample time determined at 304. If the sensor sample is early, the processor 240 may select a first weight set from memory. If the sensor sample is late, the processor 240 may select a different weight set, which may be referred to as a second weight set, from memory. The first weight set has a stronger preference for the reporting time than the second weight set. That is, the first weight set places more emphasis on the reporting time than the second weight set. After a weight set is selected, a timestamp for the sensor sample is determined as a weighted average of the expected sample time and the reporting time using the selected weight set.

Any skipped samples detected at 308 may also be considered at 310 when a timestamp for a sensor sample is determined. That is, when a skipped sensor sample is detected, the timestamp may be determined with regard for the skipped sensor sample. For example, when a sensor sample was skipped, the expected sample time may be updated to reflect the skipped sample.

Prior to any such updating, the expected sample time reflects the time when the skipped sample was expected; not the time when the detected sample should have been expected. The expected sample time may then be updated to reflect the time when the sample which was actually detected at 306 was expected. For example, the expected sample time may be updated according to the following equation.

$$EST_{updated} = EST + \frac{samples\_skipped}{Sample\_rate},$$

where $EST_{updated}$ is the updated expected sample time, EST is the expected sample time determined at 304, sample_rate is the estimated sampling rate, samples_skipped is the number of samples that were skipped between the last detected sensor sample and the sensor sample detected at 306.

The timestamp for the sensor sample detected at 306 may then be determined at 310 using the updated expected sample time and the reporting time. For example, the timestamp may be determined as an average or a weighted average of these two times.

In at least some embodiments, when the timestamp is determined it may be stored in memory and may be associated in memory with the sensor sample, which may also be stored in memory. That is, an association between the sensor sample and the timestamp may be created in memory.

As noted previously, the sensor 108 may be an orientation sensor, such as a gyroscope 107. In some such embodiments, at 312 the processor 240 may determine an orientation of the electronic device 201 based on the sensor sample and the timestamp. More specifically, the orientation of the electronic device 201 may be determined using a reference orientation, which defines a prior orientation of the electronic device 201. The timestamp and the sensor sample (i.e. the gyroscope sample) may be used to quantify the rotation from the reference orientation.

At 314, the processor 240 may update the sampling rate estimate based on the reporting time for the detected sensor sample. The sampling rate estimate may change over time. Such variations may occur, for example, due to variations in operating and/or environmental conditions associated with the electronic device 201. For example, variations in the sampling rate might occur due to a variation in temperature in the vicinity of the electronic device 201. In order to account for such variations, and in order to ensure that the sampling rate estimate obtained at 302 accurately reflects the sampling rate of the sensor 108, the processor 240 may update the sampling rate estimate.

The method 300 may then return to 304 where an expected sample time for a subsequent sample is determined based on the updated sampling rate estimate. Then, other features of the method 300 may be repeated for the subsequent sample. That is, the method 300 may repeatedly be performed. When the method 300 is performed next, the timestamp determined at 310 may be used as a starting point when determining the expected sample time for the next sample. That is, the expected sample time for the next sample may be determined based on the timestamp and the updated sampling rate estimate determined at 314.

Referring now to FIG. 4, a method 400 for determining whether a sample was skipped is illustrated in greater detail. The method 400 may, for example, be performed at 308 of FIG. 3.

At 402, the processor 240 may determine whether a detected sensor sample (which may have been detected at 306 of FIG. 3) arrived late. More specifically, the processor 240 may determine whether the reporting time for the sensor sample indicates a later time than the expected sample time. That is, the processor 240 determines whether the sensor sample arrived later than expected.

When the reporting time for the sensor sample indicates a later time than the expected sample time, at 404 the processor 240 may quantify the lateness of the sensor sample by determining the difference between the reporting time for the sensor sample and the expected sample time. That is, the electronic device 201 determines a measure of the degree to which the sensor sample is late. In at least some example embodiments, the quantified lateness of the sensor sample may be expressed as a percentage. For example, the quantified lateness may be determined as:

$$QL = \frac{\Delta t1}{\Delta t2} \times 100,$$

where QL is the quantified lateness, $\Delta t1$ is the elapsed time between a last sample and the reporting time for the current sample, $\Delta t2$ is the expected time which represents the time between a last sample and the expected sample time.

The lateness of a sensor sample may be quantified using other formulas in other embodiments.

After a measure of the amount of lateness has been determined (i.e. after the lateness has been quantified), the processor 240 may, at 406, compared the quantified lateness to one or more predetermined thresholds, which may be stored in memory. Based on this comparison, the processor 240 may determine (at 408) whether a sensor sample was skipped.

Referring now to FIG. 5, a further method 500 for determining whether a sample was skipped is illustrated. The method 500 may be performed when the method 400 of FIG. 4 is performed.

More particularly, during 406 of FIG. 4, the electronic device may compare the quantified lateness to two or more predetermined thresholds which may include a first threshold and a second threshold. In at least some embodiments, the first threshold represents a lower threshold than the second threshold.

At 502, the quantified lateness is compared to a first threshold. If the quantifies lateness is less than the first threshold, then the processor 240 may determine (at 504) that a sensor sample was not skipped. This determination may occur during 408 of FIG. 4.

If, instead, the processor 240 determines (at 502), that the quantified lateness is greater than the first threshold, then the processor 240 may compare the quantified lateness to a second threshold at 506. When the quantified lateness is greater than the second threshold, then the processor 240 may determine (at 508) that a sensor sample was skipped. This determination may occur during 408 of FIG. 4.

If a sensor sample was determined at 508 to be skipped, then the processor 240 may determine whether a plurality of successive sensor samples were skipped. That is, the processor 240 determines if more than one sensor sample was skipped (e.g. generated by the sensor 108 but not detected) between the sensor sample detected at 306 (of FIG. 3) and the last sensor sample detected prior to the sensor sample detected at 306. Thus, the processor may determine the number of skipped samples between the sensor sample detected at 306 (of FIG. 3) and the last sensor sample detected prior to the sensor sample detected at 306.

Accordingly, the processor 240 may determine whether a plurality of successive sensor samples were skipped. This determination may be made by adjusting (at 509) the expected sample time to account for the sensor sample that was determined, at 508, to be skipped. Prior to the adjustment, the expected sample time reflects the time when the skipped sample was expected; not the time when the detected sample should have been expected. Accordingly, the expected sample time may be adjusted to compensate for the skipped sample that was detected. This compensation may assume that the skipped sample was generated at its expected sample time. Accordingly, the expected sample time that was previously determined (which may have been determined at 304 of FIG. 3) may be considered to be the expected sample time for the skipped sample and a new expected sample time may be determined for a sensor sample generated after the skipped sample. That is, the previously determined expected sample time may be adjusted to account for the skipped sensor sample.

This adjusted expected sample time may then be compared with the reporting time (which may have been assigned at 306). When the reporting time indicates a later time than the adjusted expected sample time, the processor 240 may re-quantify the lateness of the sensor sample at 510. That is, the processor 240 may determine the difference between the reporting time and the adjusted expected sample time.

After the lateness has been re-quantified, the method 500 may be repeated. That is, the processor 240 may compare the re-quantified lateness to one or more predetermined thresholds (at 406) to determine whether a second sample was skipped. For example, the processor 240 may compare the re-quantified lateness to the first threshold (in the same manner described above with reference to 502) and may compare the re-quantified lateness to the second threshold (in the same manner described above with reference to 506). That is, the method 500 may be repeated using the re-quantified lateness value.

When the re-quantified lateness is less than the first threshold, the processor 240 may determine (at 504) that no additional samples were skipped (i.e. that only one sample was skipped). When the re-quantified lateness is greater than the second threshold, the processor 240 may determine (at 508) that an additional sample was skipped (i.e. that at least two samples were skipped).

This process may be repeated until the number of skipped samples is determined. That is, the processor 240 may iteratively repeat the method 500 to determine the number of skipped samples. These iterations may cease when the number of skipped samples is determined.

Other techniques may also be used apart from the iterative approach described above to allow the processor 240 to determine the number of skipped samples. For example, in some embodiments, the electronic device 201 may determine the number of skipped samples based on the time period between the sensor sample detected (i.e. based on the reporting time associated with the sample detected at 306) and the sensor sample detected prior to that sample (e.g. based on the time stamp associated with the previously detected sample) and also based on the sampling rate estimate (e.g. obtained at 302). For example, the number of skipped samples may be estimated by dividing the time period between the sensor samples by the estimated sampling rate.

In some circumstances, the quantified lateness of a sensor sample may be greater than the first threshold, but less than the second threshold. When the processor 240 determines that the quantified lateness is between the first threshold and the second threshold, the processor 240 may, at 512, determine that a sensor sample has possibly been skipped. That is, the processor 240 may determine that a sensor sample may have been skipped (e.g. generated but not detected) between the sensor sample detected at 306 (of FIG. 3) and the last sensor sample detected prior to the sensor sample detected at 306.

In order to determine whether a sensor sample was, in fact, skipped, the processor 240 may, at 514, perform an analysis on one or more subsequent sensor samples to determine whether a sensor sample was, in fact skipped. More particularly, the processor 240 may determine whether at least a predetermined number of successive subsequent sensor samples are late. This determination may be made by quantifying the lateness of subsequent sensor samples and comparing the quantified lateness of the subsequent sensor samples to one or more thresholds (which may be the thresholds used at 406). More particularly, when determining an expected sample time for the subsequent samples, the processor 240 may assume that no samples were skipped. This assumption is then tested. More particularly, quantified lateness values of the subsequent sensor samples are determined by comparing the time such sensor samples were detected to the time that such sensor samples were expected. If the assumption that no samples were skipped was erroneous, the expected sample times for the subsequent sample times will be erroneous, which will cause the quantified lateness for the subsequent sensor samples to be relatively large (i.e. to exceed a predetermined threshold). When enough subsequent successive sensor samples are determined to be late, then the processor 240 may determine that the assumption was incorrect and that a sensor sample was, in fact, skipped.

The analysis at 514 may require that at least a predetermined number of successive subsequent sensor samples be late before it will determine that a sensor sample was, in fact, skipped. A counter may be utilized in at least some embodiments to make this determination. More particularly, at 514, a counter may be used to count the number of subsequent consecutive sensor samples having a quantified lateness exceeding one or more predetermined thresholds. If the counter exceeds a predetermined limit, the processor 240 may determine that a sensor sample was, in fact, skipped.

Accordingly, in at least some example embodiments, at 502 and 506 of FIG. 5, the processor 240 effectively classifies a sensor sample as either: on time (i.e. if the quantified lateness is less than the first threshold), late (i.e. if the quantified lateness is greater than the first threshold but less than the second threshold), or very late (i.e. if the quantified lateness is greater than the second threshold. This classification is done by comparing the difference between the expected sample time and the reporting time to one or more predetermined thresholds. If the sensor sample is classified as being on time (i.e. if it was detected within a certain tolerance of the time that it was expected), then no samples were skipped (which may be determined at 504). If the sensor sample is classified as very late, then a sample was skipped (which may be determined at 508). If the sensor sample was late, the processor may (at 514) monitor whether subsequent sensor samples are either late or very late. If at least a predetermined number of successive subsequent sensor samples are late or very late, then the processor 240 may determine that a sensor sample was skipped.

While the present disclosure referred to embodiments in which sensor samples are delivered to the processor individually (i.e. one sensor sample is delivered at a time), in other examples, a sensor 108 may be used that delivers a batch of sensor samples. For example, a sensor 108 may include a buffer which stores sensor samples, allowing the sensor 108 to deliver a batch of sensor samples (i.e. a set of sensor samples) to the processor 240. In at least some such examples, the methods described herein may be modified to account for the batch. For example, in some examples, the techniques described above may be used to determine a timestamp for one of the samples in the set, such as the last sample. Then, timestamps associated with the other samples in the set may be determined through interpolation.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-Ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A processor implemented method of improving orientation detection at an electronic device, the method comprising:
    obtaining, by a processor, a sampling rate estimate for a sensor;
    determining, by the processor, an expected sample time for the sensor sample based on the sampling rate estimate;
    detecting, by the processor, the sensor sample;
    in response to detecting the sensor sample, detecting, by the processor, a reporting time for the detected sensor sample;
    assigning, by the processor, the reporting time to the detected sensor sample, the reporting time representing an identified time when the sensor sample was detected by the processor;
    determining, by the processor, based on comparing the expected sample time for the detected sensor sample and the assigned reporting time for the detected sensor sample, whether one or more sensor samples have been skipped, the one or more skipped sensor samples being undetected sensor samples generated at a time between the detected sensor sample and a previously detected sensor sample;
    in response to determining that one or more sensor samples have been skipped, updating, by the processor, the expected sample time for the detected sensor sample to reflect the one or more skipped samples;
    determining, by the processor, the timestamp for the detected sensor sample as a function of a weighting of the updated expected sample time and the reporting time for the detected sensor sample to mitigate errors that result when a period of time elapses after the sensor sample is generated but before the sensor sample is detected by the processor;
    associating, by the processor, the determined timestamp to the detected sensor sample; and
    determining, by the processor, an orientation of an electronic device based on the sensor sample and the determined timestamp.

2. The method of claim 1, further comprising:
    detecting a skipped sensor sample by:
        when the reporting time for the sensor sample indicates a later time than the expected sample time, quantifying the lateness of the sensor sample by determining the difference between the reporting time for the sensor sample and the expected sample time; and comparing the quantified lateness to one or more predetermined thresholds.

3. The method of claim 2, wherein comparing the quantified lateness to one or more predetermined thresholds comprises comparing the quantified lateness to a first threshold,
and wherein detecting a skipped sensor sample further comprises:
when the quantified lateness is less than the first threshold, determining that a sensor sample was not skipped.

4. The method of claim 3, wherein comparing the quantified lateness to one or more predetermined thresholds comprises:
comparing the quantified lateness to a second threshold, and when the quantified lateness is greater than the second threshold, determining that a sensor sample was skipped; and
when the quantified lateness is greater than the first threshold and less than the second threshold, performing an analysis on one or more subsequent sensor samples to determine whether a sensor sample was skipped.

5. The method of claim 4, wherein performing an analysis on one or more subsequent sensor samples to determine whether a sensor sample was skipped comprises:
determining whether at least a predetermined number of successive subsequent sensor samples are late and, if so, determining that a sensor sample was skipped.

6. The method of claim 5, wherein determining whether a predetermined number of successive subsequent sensor samples are late comprises:
using a counter to count the number of subsequent consecutive sensor samples having a quantified lateness exceeding a predetermined threshold;
if the counter exceeds a predetermined limit, determining that a sensor sample was skipped.

7. The method of claim 4, further comprising:
when the quantified lateness is greater than the second threshold, detecting whether a plurality of successive sensor samples were skipped.

8. The method of claim 7, wherein detecting whether a plurality of successive sensor samples were skipped comprises:
adjusting the expected sample time to account for the skipped sensor sample; and
when the reporting time indicates a later time than the adjusted expected sample time, re-quantifying lateness of the sensor sample by determining the difference between the reporting time and the adjusted expected sample time; and
comparing the re-quantified lateness to the second threshold, and when the re-quantified lateness is greater than the second threshold, determining that a second sensor sample was skipped.

9. The method of claim 2, wherein, when a skipped sensor sample is detected, the timestamp is determined with regard for the skipped sensor sample.

10. The method of claim 1, wherein determining a timestamp for the sample based on the expected sample time and the reporting time comprises:
determining the timestamp for the sample as a weighted average of the expected sample time and the reporting time.

11. The method of claim 10, wherein determining the timestamp for the sensor sample as a weighted average of the expected sample time and the reporting time comprises:
selecting a first weight set if the sensor sample is early;
selecting a second weight set if the sensor sample is late, wherein the first weight set has a stronger preference for the reporting time than the second weight set; and
determining the timestamp as a weighted average of the expected sample time and the reporting time using the selected weight set.

12. The method of claim 1, further comprising:
updating the sampling rate estimate based on the reporting time for the detected sensor sample.

13. The method of claim 1, further comprising:
classifying a sensor sample as either: on time, late, or very late, by comparing the difference between the expected sample time and the reporting time to one or more predetermined thresholds;
if the sensor sample was late, monitoring whether subsequent sensor samples are either late or very late; and
if at least a predetermined number of successive subsequent sensor samples are late or very late, determining that a sensor sample was skipped.

14. The method of claim 13, further comprising:
if the sensor sample was very late, determining that a sensor sample has been skipped.

15. An electronic device having improved orientation detection, the electronic device comprising:
a sensor; and
a processor coupled to the sensor, the processor being configured to:
obtain a sampling rate estimate for the sensor;
determine an expected sample time for a sensor sample based on the sampling rate estimate;
detect the sensor sample;
in response to detecting the sensor sample, detect a reporting time for the detected sensor sample;
assign the reporting time to the detected sensor sample, the reporting time representing an identified time when the sensor sample was detected by the processor;
determine, based on comparing the expected sample time for the detected sensor sample and the assigned reporting time for the detected sensor sample, whether one or more sensor samples have been skipped, the one or more skipped sensor samples being undetected sensor samples generated at a time between the detected sensor sample and a previously detected sensor sample;
in response to determining that one or more sensor samples have been skipped, update the expected sample time for the detected sensor sample to reflect the one or more skipped samples;
determine a timestamp for the detected sensor sample as a function of a weighting of the updated expected sample time and the reporting time for the detected sensor sample to mitigate errors that result when a period of time elapses after the sensor sample is generated but before the sensor sample is detected by the processor;
associating the determined timestamp to the detected sensor sample; and
determine an orientation of the electronic device based on the sensor sample and the determined timestamp.

16. The electronic device of claim 15, wherein the processor is further configured to:
  detect a skipped sensor sample by:
   when the reporting time for the sensor sample indicates a later time than the expected sample time, quantifying the lateness of the sensor sample by determining the difference between the reporting time for the sensor sample and the expected sample time; and
   comparing the quantified lateness to one or more predetermined thresholds.

17. The electronic device of claim 15, wherein the sensor is a gyroscope and wherein the processor is further configured to determine an orientation based on the sensor sample and the timestamp.

18. A non-transitory computer readable storage medium comprising computer-executable instructions for improving orientation detection at an electronic device, the computer-executable instructions comprising:
  instructions for obtaining a sampling rate estimate for a sensor;
  instructions for determining an expected sample time for the sensor sample based on the sampling rate estimate;
  instructions for detecting the sensor sample;
  in response to detecting the sensor sample, instructions for detecting a reporting time for the detected sensor sample;
  instructions for assigning the reporting time to the detected sensor sample, the reporting time representing an identified time when the sensor sample was detected by a processor;
  instructions for determining, based on comparing the expected sample time for the detected sensor sample and the assigned reporting time for the detected sensor sample, whether one or more sensor samples have been skipped, the one or more skipped sensor samples being undetected sensor samples generated at a time between the detected sensor sample and a previously detected sensor sample;
  in response to determining that one or more sensor samples have been skipped, instructions for updating the expected sample time for the detected sensor sample to reflect the one or more skipped samples;
  instructions for determining the timestamp for the detected sensor sample as a function of a weighting of the updated expected sample time and the reporting time for the detected sensor sample to mitigate errors that result when a period of time elapses after the sensor sample is generated but before the sensor sample is detected by the processor;
  instructions for associating the determined timestamp to the detected sensor sample; and
  instructions for determining an orientation of an electronic device based on the sensor sample and the determined timestamp.

* * * * *